United States Patent
Sophinos et al.

(10) Patent No.: US 10,212,542 B2
(45) Date of Patent: Feb. 19, 2019

(54) FACILITATING A MEETING OR EDUCATION SESSION

(71) Applicant: Course Key, Inc., Wilmington, DE (US)

(72) Inventors: Lucas Sophinos, Redondo Beach, CA (US); Fadee Kannah, El Cajon, CA (US); Ming Zhong, Tokyo (JP); Marc Barron, San Diego, CA (US)

(73) Assignee: Course Key, Inc., Wilmington, DE (US)

( * ) Notice: Subject to any disclaimer, the term of this patent is extended or adjusted under 35 U.S.C. 154(b) by 0 days.

(21) Appl. No.: 15/088,061

(22) Filed: Mar. 31, 2016

(65) Prior Publication Data
US 2016/0302034 A1    Oct. 13, 2016

Related U.S. Application Data

(60) Provisional application No. 62/143,922, filed on Apr. 7, 2015.

(51) Int. Cl.
*H04W 4/021* (2018.01)
*G06Q 50/20* (2012.01)

(52) U.S. Cl.
CPC ............ *H04W 4/021* (2013.01); *G06Q 50/20* (2013.01)

(58) Field of Classification Search
CPC .............................. H04W 4/021; G06Q 50/20
USPC .................................. 455/456.1, 456.3, 457
See application file for complete search history.

(56) References Cited

U.S. PATENT DOCUMENTS

| | | | | |
|---|---|---|---|---|
| 2004/0191744 A1* | 9/2004 | Guirguis | ............. | G09B 5/00 434/322 |
| 2008/0042898 A1* | 2/2008 | Sharma | ............. | G01S 5/14 342/450 |
| 2010/0318701 A1* | 12/2010 | Srinivasan | ............. | G06Q 10/10 710/104 |
| 2012/0190386 A1* | 7/2012 | Anderson | ............. | G01C 15/04 455/456.3 |
| 2012/0202185 A1* | 8/2012 | Jabara | ............. | G09B 5/00 434/350 |

(Continued)

OTHER PUBLICATIONS

Clicker home page, i>clicker, Accessed on Feb. 21, 2015, 4 pages, https://www1.iclickercom.

(Continued)

*Primary Examiner* — Mong-Thuy T Tran
(74) *Attorney, Agent, or Firm* — Troutman Sanders LLP; Christopher C. Close, Jr.

(57) ABSTRACT

Methods include receiving location data of a location associated with a meeting, and receiving check-in information from a member's device associated with a member in an audience. The meeting has a leader. A geo-fence is set, based on the location associated with the meeting. The member's device is determined whether it is within the geo-fence using at least one of (a) using a location sensor disposed within the member's device; and (b) identifying a locatable device that has a known location and that is connected to or nearby the member's device. Feedback from a plurality of devices associated with a group of members of the audience is collected, each one of the plurality of devices having its location determined as to whether it is within the geo-fence using at least one of (a) or (b) in conjunction with the collecting of feedback. The feedback is sent to the leader's device.

18 Claims, 12 Drawing Sheets

(56) References Cited

U.S. PATENT DOCUMENTS

| | | | | |
|---|---|---|---|---|
| 2013/0110895 A1* | 5/2013 | Valentino | | G06F 7/588 |
| | | | | 708/255 |
| 2013/0191445 A1* | 7/2013 | Gayman | | H04L 29/06047 |
| | | | | 709/203 |
| 2013/0204675 A1* | 8/2013 | Dobell | | G06Q 10/06398 |
| | | | | 705/7.42 |
| 2013/0225196 A1* | 8/2013 | James | | H04W 4/022 |
| | | | | 455/456.1 |
| 2013/0331192 A1* | 12/2013 | Betti | | A63F 13/12 |
| | | | | 463/42 |
| 2014/0114776 A1* | 4/2014 | Solanki | | G06Q 30/06 |
| | | | | 705/15 |
| 2014/0120511 A1* | 5/2014 | Hall | | G09B 5/02 |
| | | | | 434/350 |
| 2014/0164945 A1* | 6/2014 | Junqua | | G06F 19/3412 |
| | | | | 715/747 |
| 2014/0368601 A1* | 12/2014 | deCharms | | H04W 4/021 |
| | | | | 348/14.02 |
| 2016/0005003 A1* | 1/2016 | Norris | | G06Q 10/10 |
| | | | | 705/7.19 |
| 2016/0057565 A1* | 2/2016 | Gold | | H04L 67/12 |
| | | | | 455/41.1 |
| 2016/0080892 A1* | 3/2016 | Basalamah | | H04W 4/008 |
| | | | | 455/41.2 |
| 2016/0100438 A1* | 4/2016 | Ursitti | | H04W 4/021 |
| | | | | 455/456.3 |
| 2017/0279957 A1* | 9/2017 | Abramson et al. | | |
| | | | | H04M 1/72577 |

OTHER PUBLICATIONS

Poll Everywhere Home page, Poll Everywhere, Accessed on Feb. 21, 2015, 2 pages; https://polleverywhere.com.

Top Hat Home Page, Top Hat Monocle Inc., Accessed on Feb. 21, 2015, 4 pages, https://tophat.com/.

* cited by examiner

FIG. 5

FACILITATING A MEETING OR EDUCATION SESSION

RELATED APPLICATIONS

This application claims the benefit of U.S. Provisional Patent Application No. 62/143,922 filed on Apr. 7, 2015 and entitled "Method for Facilitating a Meeting or Education Session"; which is hereby incorporated by reference for all purposes.

BACKGROUND OF THE INVENTION

Software applications have become ubiquitous in all aspects of business and other interactions. For example, higher education classes utilize on-line applications for communicating and disseminating information between an instructor and students. Applications that take and track attendance, both web-based and those based on a personal electronic device, have also been developed.

As the utility of software applications continues to grow, opportunities exist for providing improved and new functionality for coordinating meetings between people.

SUMMARY

Methods include receiving location data of a location associated with a meeting, and receiving check-in information from a member's device associated with a member in an audience. The meeting has a leader. A geo-fence is set, based on the location associated with the meeting. The member's device is determined whether it is within the geo-fence using at least one of (a) using a location sensor disposed within the member's device; and (b) identifying a locatable device that has a known location and that is connected to or nearby the member's device. Feedback from a plurality of devices associated with a group of members of the audience is collected, each one of the plurality of devices having its location determined as to whether it is within the geo-fence using at least one of (a) or (b) in conjunction with the collecting of feedback. The feedback is sent to the leader's device.

BRIEF DESCRIPTION OF DRAWINGS

FIG. 5 shows a screen for allowing a professor to create a real-time assessment, according to some embodiments.

DETAILED DESCRIPTION OF THE EMBODIMENTS

Figure 1:
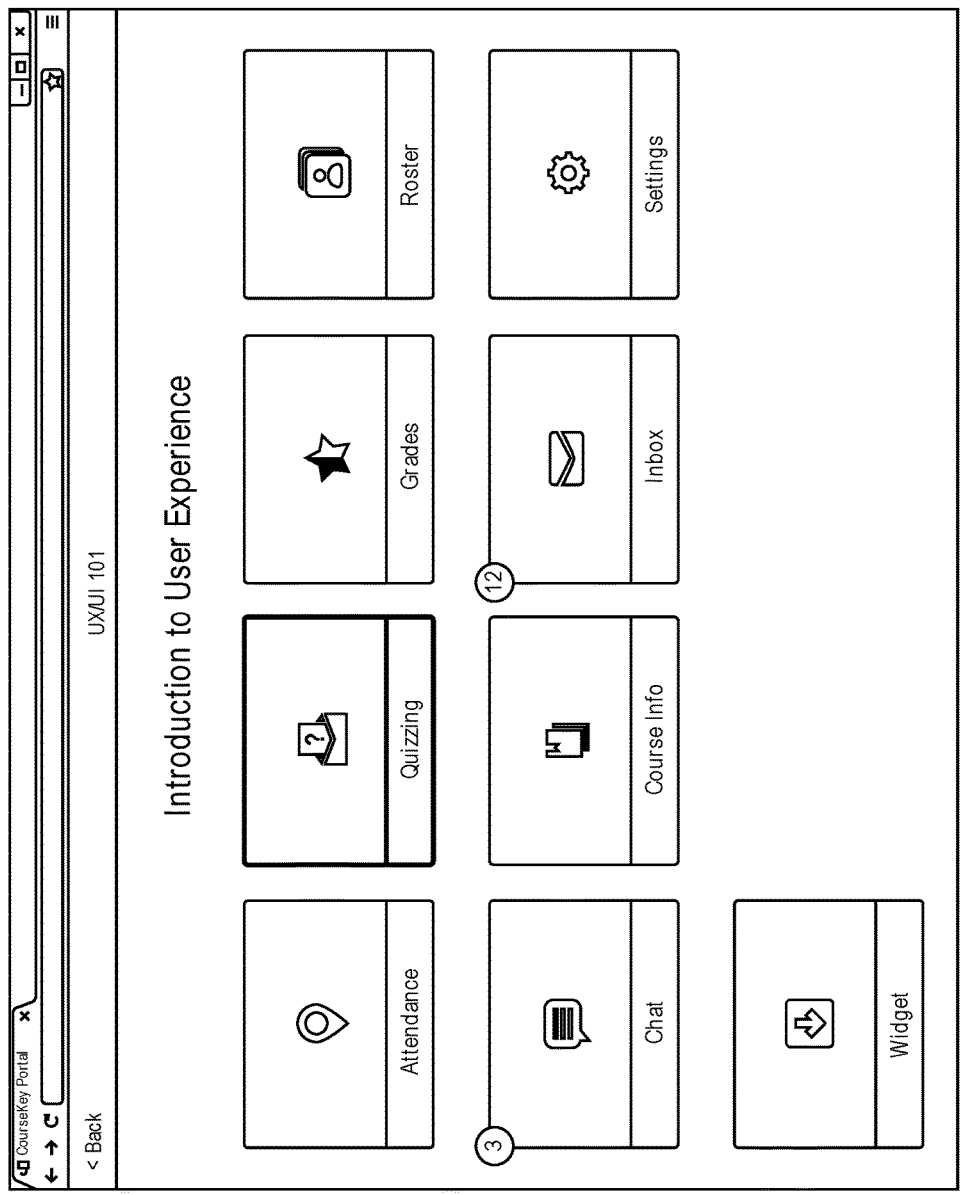
FIG. 1 shows a home page of a leader interface, according to some embodiments.

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

In classroom lecture courses of various sizes, both professors and students experience issues in managing attendance, grades and general communication. The lack of personalization in the student experience, and restrictions placed on educators as a result of the time constraints and increasing enrollment rates, creates a need for tools to facilitate these classes. Methods and systems are described herein for facilitating meetings or education sessions, that involve web and mobile interaction ensured through verifying location data such as global positioning system (GPS) locations. For higher education situations, the methods encourage student attendance, in-class interaction, and social learning while preventing academic dishonesty by combining a location-verification technology process with real-time assessments. Embodiments may also provide an automated student administrative assistant, and offer dedicated 24/7 classroom chat capability. The present methods uniquely combine location data and student recognition technology with attendance and real-time assessment features. The location verification methods utilize multiple techniques for determining a member's location, thus resulting in an improved ability to confirm their location and with greater accuracy.

Although the present methods shall be described in terms of academic settings, such as higher education courses at the college and university level, the methods are also applicable to other situations in which members ranging from a few to many in number are attending a gathering. For instance, the methods may be used for business meetings, professional conferences and community organizations. Thus, references to a professor or teacher in the embodiments described herein are applicable to a leader, manager or organizer of other types of groups. Similarly, references to a student in a class are applicable to members or participants of other types of groups or audiences.

In this disclosure, the term mobile device refers to a portable computing device, for example, a smartphone, tablet, laptop, smartwatch or other wearable computer device. The methods herein may be implemented on mobile devices or on non-mobile devices such as a stationary desktop computer, a kiosk, or an interface screen built into a desk or workstation. User interface screens described herein may apply to a web application or to a mobile operating system such as iOS™ or Android OS™.

Additionally, references to a GPS sensor or GPS device in this disclosure also apply to other types of location sensor. The location sensor may be built into an electronic device (e.g. smartphone, computer terminal, etc), or may be attached to the electronic device.

FIG. 1 shows an exemplary menu screen of a software application of the present methods, embodied as a home page of a leader interface (e.g., a professor). The menu in this embodiment is configured for a web application and includes the following items: attendance, quizzing, grades, roster, chat, course info, inbox, settings, and widget. The "Attendance" tab allows a leader to enable attendance check-in for a meeting, and to view attendance statistics. The "Quizzing" tab allows creation of real-time assessments, where the audience member's location is verified when responses are submitted. The "Grades" tab allows the leader to view and manage grades. The "Roster" tab provides the leader with a listing of participants in the meeting. "Chat" allows a leader to converse with audience members. "Course info" allows the leader to manage information about the meeting or course. For example, for an academic course, a professor may input a course name, course title, course description, schedule number, and dates and times for the class. "Inbox" is a menu for email messages. "Settings" allows the leader to customize their settings such as their login information and viewing preferences. "Widget" enables the leader to run functions as a separate application, such as performing an assessment quiz without having the web page open for the full software application.

Figure 2:
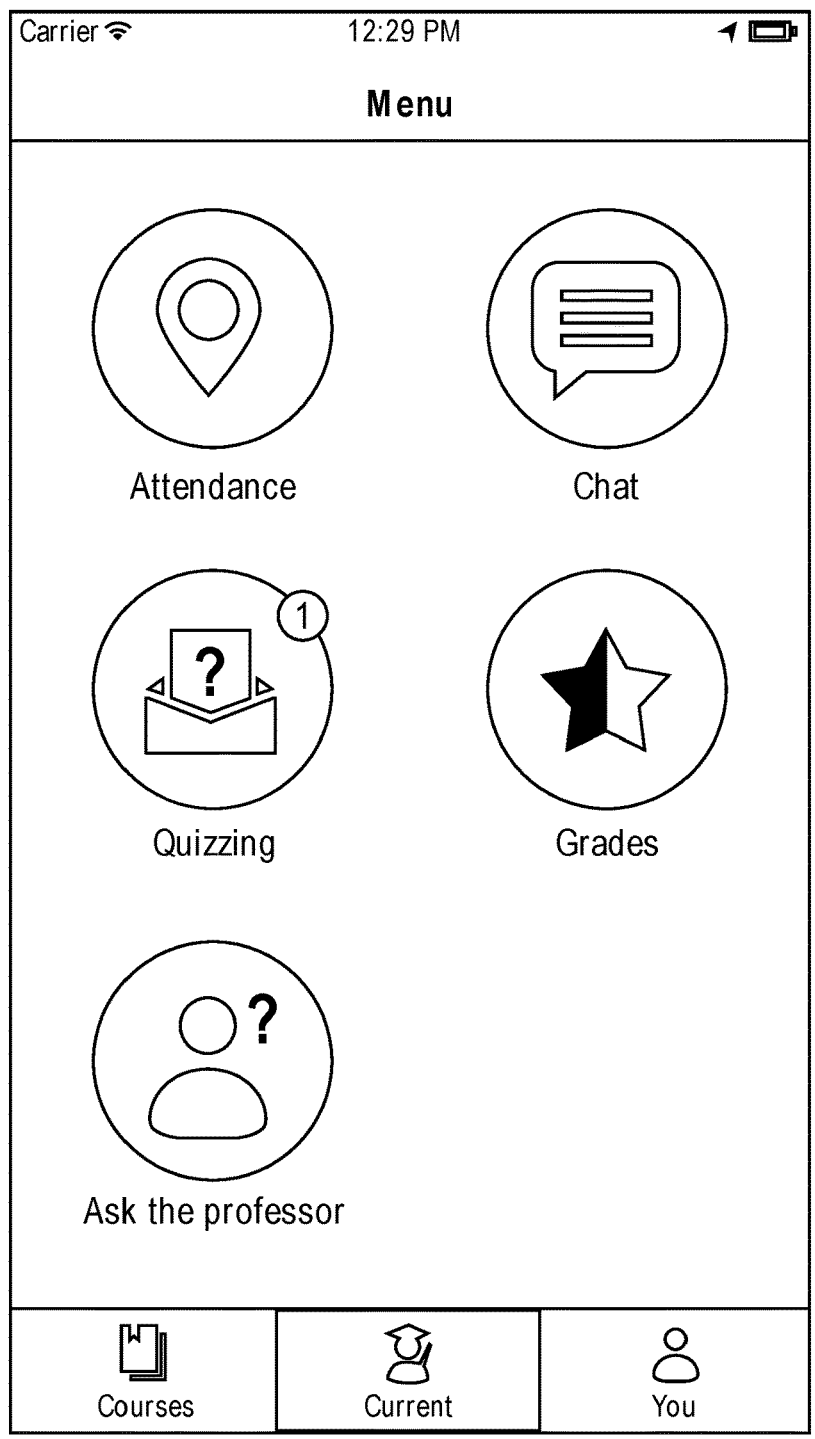
FIG. 2 shows a home page for an audience member, according to some embodiments.

FIG. 2 shows a home page for an audience member. The home page in this embodiment is configured for a mobile device, where the audience member is a student in a class. The tabs at the bottom of the screen are Courses, Current and You. The "Courses" tab may show a listing of the courses in which the student is enrolled, along with information for each course such as the instructor's name, class hours, classroom number, lab hours, office hours, professor's contact information, and a payment portal. The "Current" tab—as shown in FIG. 2—includes buttons for attendance, chat, quizzing, grades, and ask the professor in this embodiment. The "You" tab may include items for, as an example, managing the student's school information, managing their account, querying for help questions, contacting a support center, viewing terms and policies, and logging out.

When a student is logging into a class for the first time, in some embodiments the student may be asked to input a unique registration code. In other embodiments, the student simply sets up a login account. After logging in, the student selects a class for which to register, and clicks a "register" button or similar prompt to submit their information for that class. They are then registered in the class and able to access data corresponding to the class any time throughout its course. In subsequent sessions with the software application, students see a "Select a Class" list after logging in, where they choose a class for which they have already registered.

Figure 3:
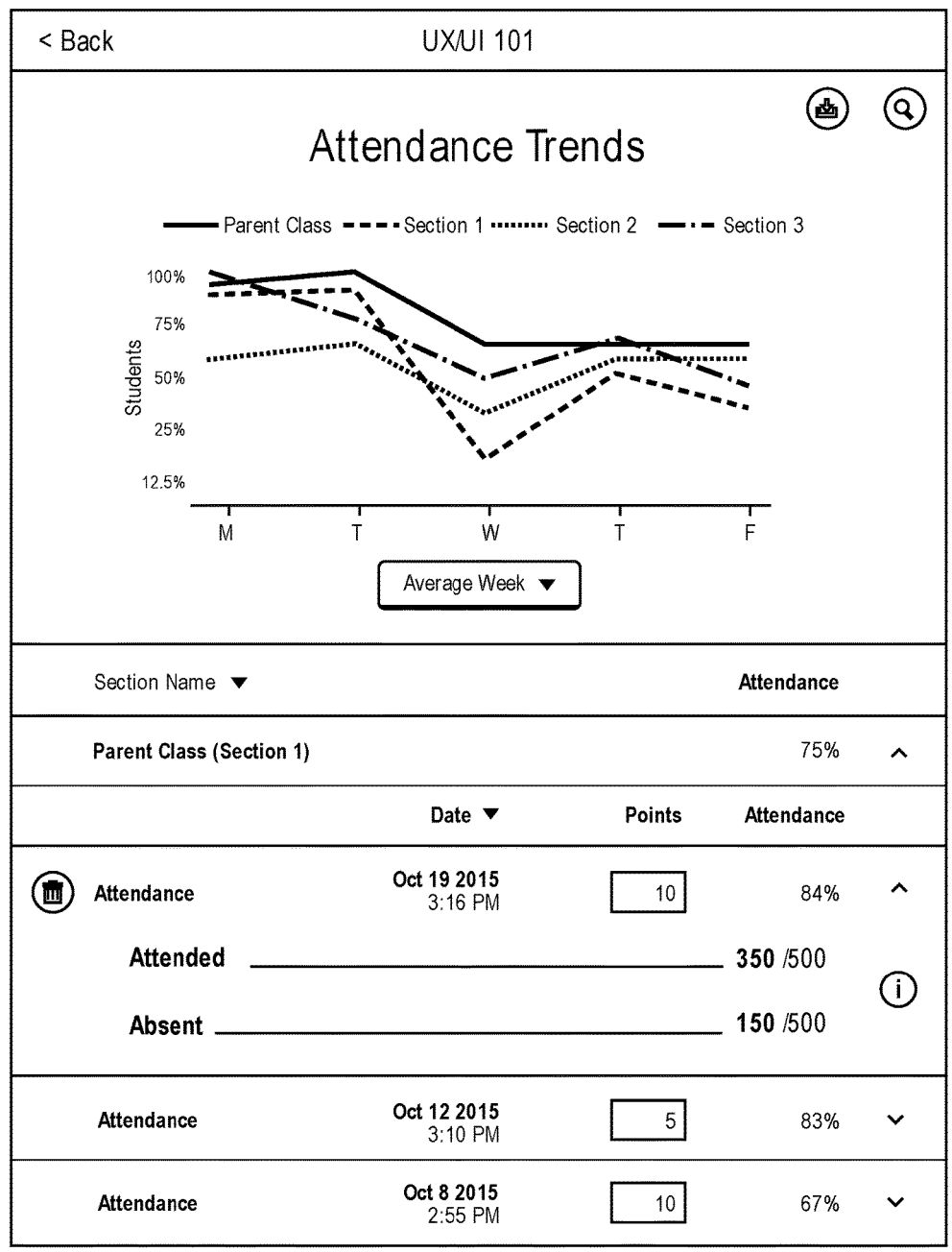
FIG. 3 shows a leader's attendance screen for an academic class, according to some embodiments.
Figure 4:
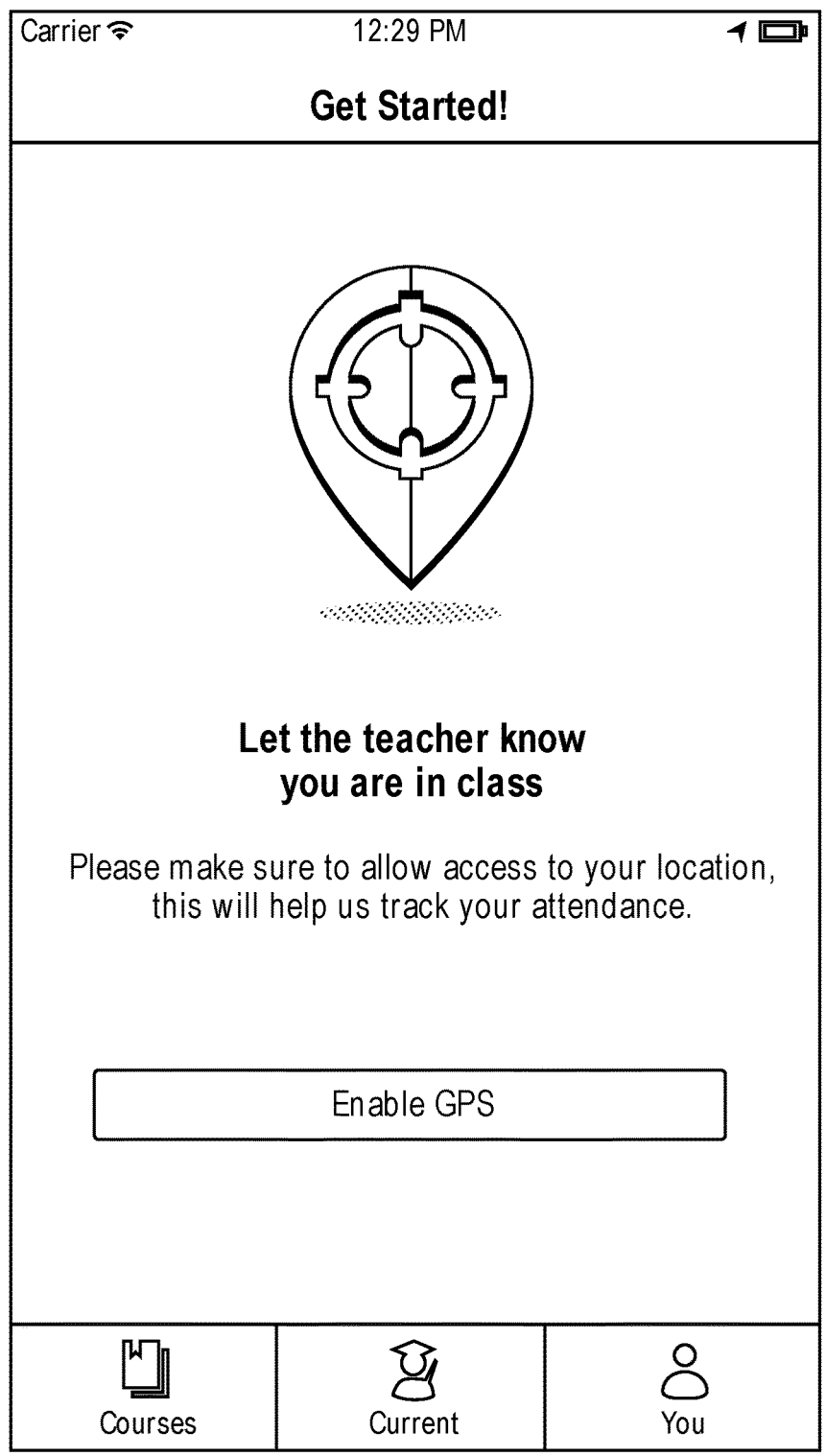
FIG. 4 shows a screen where a user's device is prompted to enable GPS, according to some embodiments.

FIG. 3 shows an exemplary leader's attendance screen for an academic class, where the teacher can view attendance trends and statistics for specific dates in this embodiment. Attendance is recorded by students indicating their presence through a check-in screen on their a mobile or stationary device. The student opens the software application, where the leader has enabled attendance information to be entered, and the student is prompted to click a "check-in" button to record that they are present at the class. The student may be given a certain time period to respond. The student's device may first be prompted to enable a location sensor (e.g., a GPS, or GPS-like, device) as shown in FIG. 4 to facilitate location verification. The students' locations are checked for whether they are within a designated class area—that is, a geo-fence—when check-in information by the students is processed by the system.

In some embodiments, the student check-in may be achieved with a verification code, where the professor is optionally provided by the software system with a code for students to be recorded as attending their class. This code is a unique code that may be, for example, an alphanumeric sequence, a bar code or quick response (QR) code that is generated by the software system. The professor displays that code on a screen for the class, and the student enters the code when they check in for attendance. In some embodiments, both a type-in code (i.e., numbers and letters) and a scanning code are generated, so that students have more than one option for entering the code, depending on the type of device they are using. For example, a student can type in the sequence of letters and numbers of the leader's unique code if they are using a laptop computer, or they can scan the QR code if they are using their smartphone. In certain embodiments, a leader can request entry of a unique code more than once during a session. At each instance, the system verifies that the members are still present at the proper location.

Figure 5:
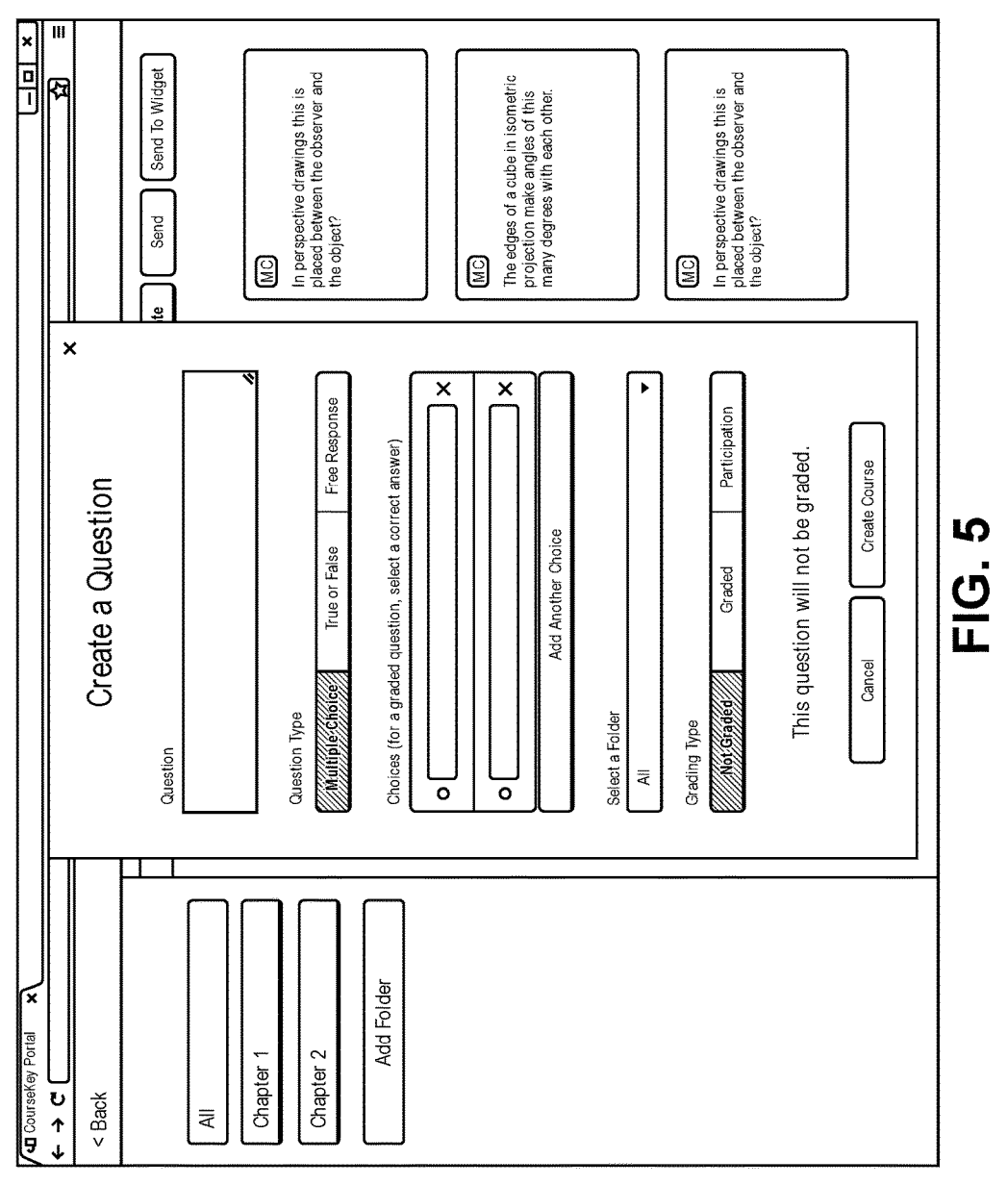

FIG. 5 shows a web screen for allowing the professor to create a real-time assessment; that is, a query that requires a response during the meeting (e.g, class). The assessment may be, for example, a poll or quiz. The professor enters a question, and chooses an answer option which may be multiple choice, true/false, or free response in this embodiment of FIG. 5. Other embodiments may utilize other question types including exact value, word & numeric, formulas, multiple answers and randomized answers or standard. In FIG. 5, the multiple choice format is chosen, and fields are displayed in which the professor enters the answer choices. The professor may also choose different grading types, such as graded, not graded or participation. For the graded type, the student's answer is graded on whether it is correct; for not graded, the student's grade is not affected by whether or not they answered the question; and for participation, the system records if the student responded, but the accuracy of their answer is not assessed.

In some embodiments, attendance or participation points are generated each time an input by the student (e.g., answer to a poll or quiz, or unique code) is received and verified as being within the class area. In various embodiments, the points may alternatively be recorded as, for example, credits or other type of data. The class area is a geo-fence determined by the system, as shall be described subsequently in further detail. For example, one point may be earned when each assessment check has been verified. Zero points are earned if the system detects that the student is outside of the class geo-fence. Students can view their grades—including a listing of each assignment, the date of the assignment, the grade for each item, and their participation assessment points—in their "Grades" menu item.

In some embodiments of the assessment feature, the professor may choose from previously-created questions and answer options that are stored on the software system. In various embodiments, results of the participation assessment may be compiled and displayed, such as in the form of charts or graphs for the students to view. The student may optionally be provided the opportunity to opt out of listing their name when results are displayed, which can encourage students to participate in classroom discussions without drawing attention to themselves. Professors are allowed to see the student name to prevent from any vulgarity, but they will see that the student wishes to remain anonymous in situations such as if their question is answered out loud during class. In other embodiments, details of the real-time assessments may be accessed afterwards by the students, such as by viewing the questions that have been posed, and viewing what the correct answer was along with explanations of why other answers were not correct.

The real-time assessment feature described in FIG. 5 provides an opportunity for interaction in the class, thus creating a more personal experience for the participant. The assessment responses—that is, feedback—is collected and sent to the leader. When the students send their answers, the system verifies that the student is still within the designated geo-fence zone, thus providing continued monitoring of student attendance throughout the class period. The ability to verify an audience member's location real-time, at any point during the event, provides encouragement for the audience member to stay engaged during the entire event, and also allows the leader to monitor attendance more comprehensively. The location verification is conducted in conjunction with the collecting of feedback, such as simultaneously with or soon after the response is received.

In some embodiments, a student may ask a question from their device during the class or session. An indicator such as a graphical symbol may be displayed on the professor's screen to indicate that a student is asking a question. The indicator may also include a numerical value displayed with it, to show how many questions are pending. The professor can view student questions and respond to the questions. The professor's interface can display the name of the student who asked the question, and after reading the question, the professor can choose to respond immediately or to archive the question for future reference.

Figure 6:
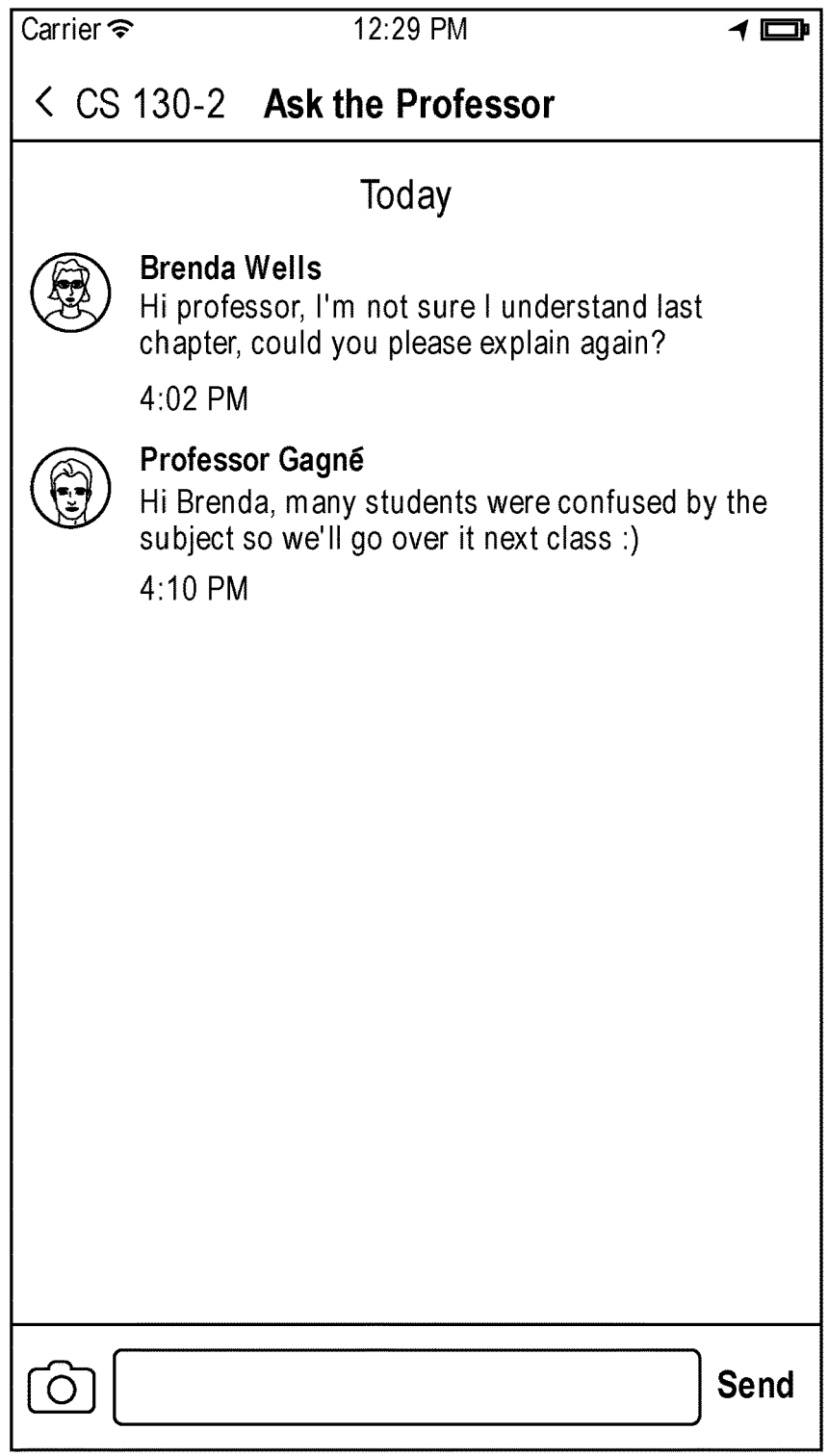
FIG. 6 shows a screen to ask a professor a question, according to some embodiments.

FIG. 6 shows a sample screen where students can ask the professor a question directly from their device, such as a smartphone, laptop, tablet, or smartwatch. The screen includes a field where they can type in their question, similar to text messaging on a mobile device in this embodiment. The software application can also include chat capabilities between students, where students can, for example, contact other individuals or create group messages such as to collaborate on a project.

In some embodiments, the methods may include a built-in "bot"; that is, an automated response system of meeting-related questions. In one embodiment, a symbol is used before a query word, to which an automated assistant responds. The automated assistant may be programmed to search for the designated symbol in the queries. For example, the designated symbol may be an exclamation point, where queries such as "!contact", "!officehours", "!exam", or "!quiz" elicit particular responses. An automated answer to "!exam" may be, for example, a listing of the dates of all the exams for that course, including the final exam, and the point values for each exam. In other examples, the system answers the query "!quiz" from a student by listing information about upcoming quizzes for the class; and the query "!contact" results in the system providing the professor's contact information.

Further embodiments of the present methods include receiving content from the leader's device; processing the content; and transmitting the content to devices associated with a group of leaders or to a plurality of devices associated with a group of members. This content may be, for example, attendance information or assessment results to be sent to other leaders in a department, or syllabus changes of which students are being notified. Embodiments may also include receiving and sending private messages between at least some of the group of members and the leader, where the group of members is associated with the leader, and the private messages are only sent between the group of members and the leader.

Figure 7:
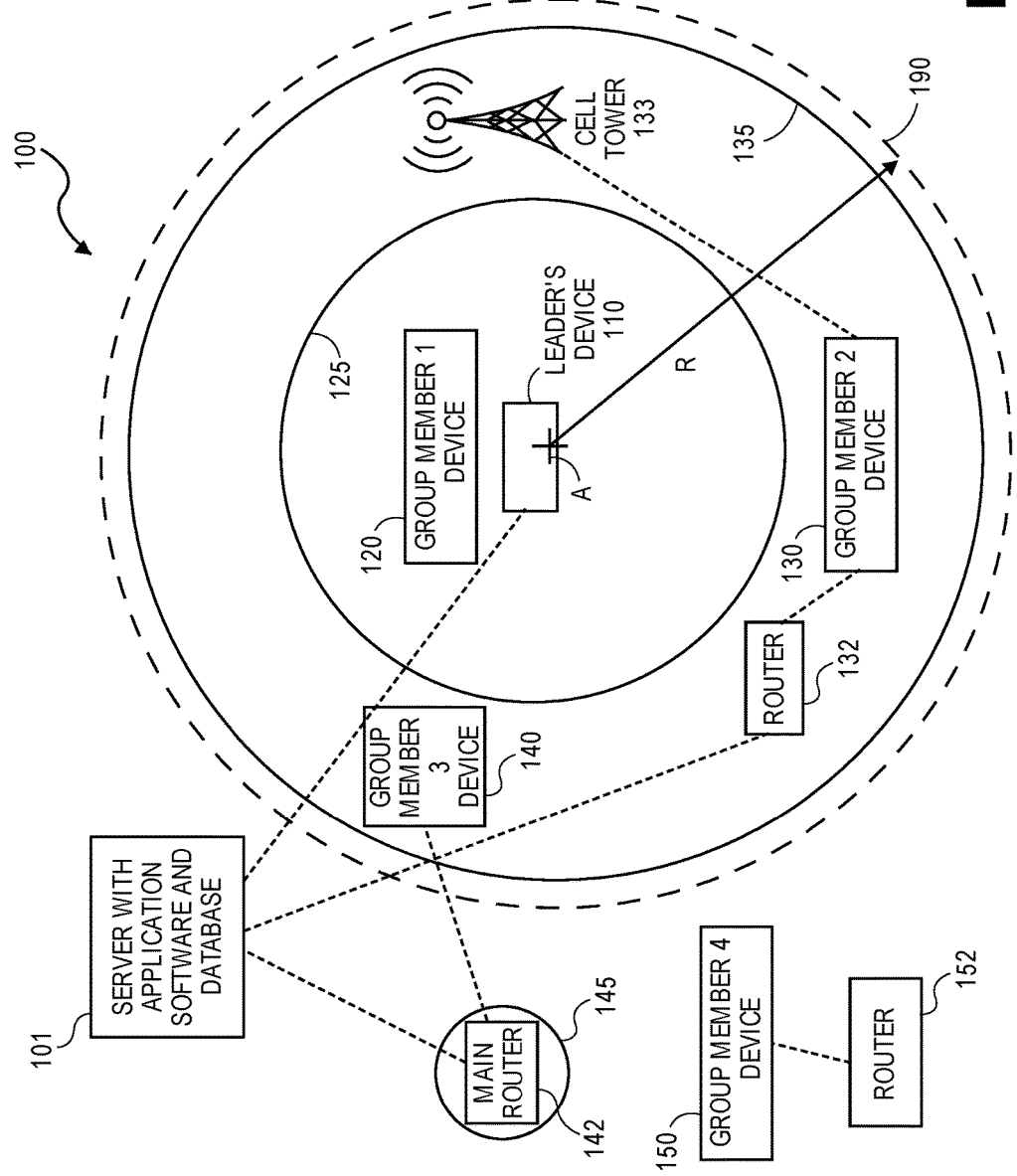
FIG. 7 is a system diagram showing location detection of group members relative to a leader.

FIG. 7 is an exemplary system diagram 100 demonstrating location detection methods for verifying the location of a member in the meeting or class. This location detection may occur when, for example, verifying whether a member's code matches the leader's unique code, or when a member inputs an answer to a poll or quiz assessment. The system can determine a member's location using one of various methods—a location sensor (e.g., a GPS sensor) built into or attached to the member's device, or another locatable device to which the member's device is connected, where the other device can include a Wifi router or a main router to which the member's device is connected.

In FIG. 7, an application software program and a database is housed on server 101. A device 110 associated with the leader is positioned at a location "A", which is used as the center of a geo-fence area 190 for the meeting or class. The leader's device 110 may be a mobile device or a stationary device, where the stationary device can be, for example, a computer station or a sensor associated with the meeting room where the leader is located. In other embodiments, the location A is any appropriate location associated with the meeting and is defined or determined in any appropriate manner, e.g., by a known location of the facility in which the meeting is held, a location of a particular locatable device disposed within the meeting facility (whether or not associated with the leader), etc. The meeting facility may be, for example, a room, a building, or an outdoor area. Furthermore, the location associated with the meeting may be based on a combination of information from the leader's location and/or the location of the meeting area.

In the illustrated embodiment of FIG. 7, the geo-fence 190 has a pre-determined radius "R" which has been set based on, for example, a known size of the classroom or meeting location. Other embodiments may have other regular or irregular shapes for the geo-fence 190, or may use any other appropriate technique for defining the geo-fence 190. For example, other embodiments may include using known coordinate points of the corners of the meeting room, any polygon shape that encompasses location A, any series of lines and curves that define an area, etc. The system determines whether a device associated with a member is within the geo-fence area 190 based on the accessibility of the member's device as detected by, for example, a location sensor (e.g., a GPS sensor) built into or attached to the member's device, Wifi routers, or other devices connected to the member's device. In a first location detection method, group member 1 has a GPS chip, or other location sensor device, located in, or attached to, their device (designated as 120 in FIG. 7), where device 120 may be a mobile device or stationary device. The location sensor operates under a native application on the mobile device or through a web application interface of the member's device. Circle 125 denotes the valid area resulting from the location accuracy based on the location sensor of device 120 of group member 1. The system is able to verify the location of device 120 with a high accuracy having a radius indicated by circle 125, around location "A" of the leader's device 110.

In another scenario, group member 2 does not have a GPS chip or location sensor in their device, designated as reference number 130. Thus, the system must use another methodology to locate group member 2. In this second location detection method, the system uses other devices to which the member's device is connected or that are nearby, in order to determine the member's location. That is, the second location detection method involves identifying a locatable device that has a known location and that is connected to or nearby the device of the group member. These other devices may include Wifi router 132 or cell tower 133 as shown in FIG. 7. In various embodiments, the second location detection method may utilize, for example, the Wifi router coordinates, coordinates of a main router associated with the member, coordinates of a mobile device wirelessly connected to the same WiFi router to which the member's device is connected, cellular triangulation, a Wifi router polling of nearby devices, an internet service provider, a radio transponder device or near field communication. Circle 135 denotes the location accuracy of group member 2 as a result of using Wifi router 132, the accuracy being lower than if using a location sensor within the device 130 itself. Thus, circle 135 has a radius that is larger than circle 125.

Another situation for the second location detection method may occur if a nearby device cannot be located. This may occur, for example, if the classroom or meeting location is underground. This situation is demonstrated by group member 3, who is in the geo-fence 190 but does not have a built-in location sensor in their device (designated as 140 in FIG. 7) and is unable to connect to either Wifi router 132 or cell tower 133. In this scenario, a main router 142, to which group member 3's device 140 is connected, is used as the pinning location for the device 140 associated with group member 3. Main routers typically have a high location accuracy, and thus circle 145 has a small radius centered around the main router 142 itself. Although main router 142 is not within geo-fence 190, main router 142 is associated with server 101 that is associated with the system software used by the leader, and thus is considered to be within a radius of circle 125, 135, 145 or geo-fence 190 for the class.

In a final scenario, group member 4 has a device (designated as 150 in FIG. 7) that is determined to have a location as not being within the designated geo-fence area 190, and thus group member 4 is considered as not attending the session or meeting. The location of device 150 may be determined using, for example, a location sensor disposed within device 150, or by identifying the location of a router 152 that is nearby or associated with device 150. In contrast, the devices of group members 1, 2 and 3 (reference numbers 120, 130 and 140) are confirmed as being within geo-fence 190.

Figure 8:
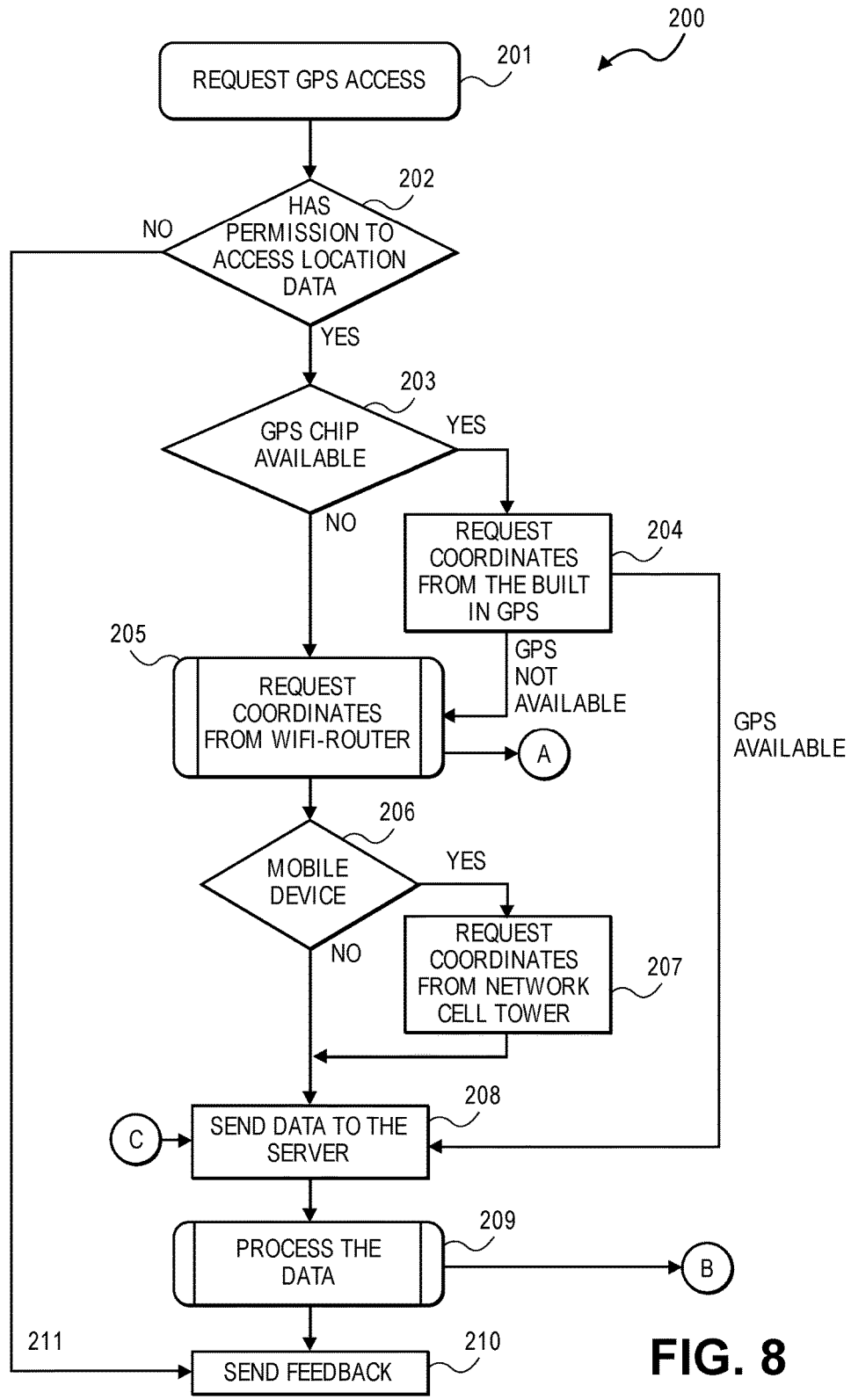
FIG. 8 is a flowchart for verifying the location of a member's device in a meeting, according to some embodiments.
Figures 9, 10:
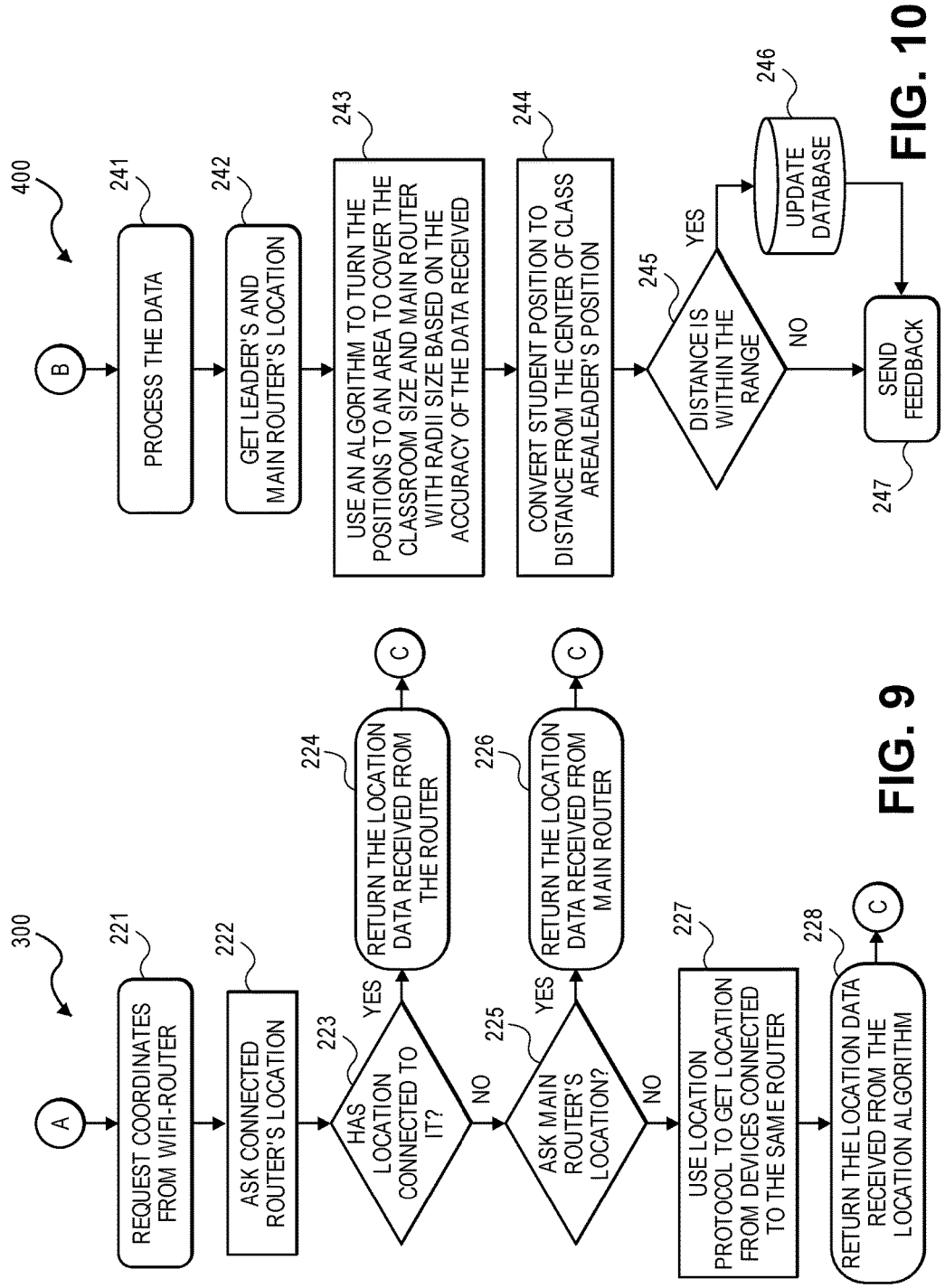
FIG. 9 is a flowchart for additional location detection methods in some embodiments, to be used with the methods of FIG. 8.
FIG. 10 is a flowchart for setting a geo-fence in some embodiments, to be used with the methods of FIG. 8.

Flowchart 200 of FIG. 8 provides further details of verifying the location of a member's device in a meeting or class, in conjunction with the flowcharts of FIGS. 9 and 10. The flowchart 200 of FIG. 8 describes an overview of determining a member's location and processing that information with the server. The methodology uses a variety of location detection techniques to check a member's location, which in some embodiments is performed in a hierarchy such that the most commonly accessible and accurate methods are used first. This hierarchy and ability to use different locating techniques improves the efficiency and accuracy for determining the location of a member's device. The flowchart 300 of FIG. 9 describes options to check a member's location using routers or other devices to which the member's device is linked. The flowchart 400 of FIG. 10 describes determining a geo-fence or class area. As described previously, the member's device may be a mobile device or a stationary device.

Although the embodiments of FIGS. 8-10 are described in terms of a GPS sensor, other embodiments may utilize other types of location sensors. Similarly, the center of the geo-fence as described by the location of a leader's device may alternatively defined by any appropriate location associated with a meeting. Furthermore, the geo-fence which is embodied as a circular area in FIGS. 7 and 10 may utilize other shapes for the geo-fence area in other embodiments.

In FIG. 8, the flow starting at step 201 describes an overview of a method by which to determine the member's location. The system requests access to location information, such as from a GPS device via, for example, a native application on a mobile device or an HTML5 protocol for a web application on a stationary or mobile device. In step 202, if the system has permission from the member's device to access location data, then the system determines in step 203 whether a GPS chip or location sensor is present in the device associated with the member. If a built-in GPS sensor is available, then location coordinates are requested from the GPS sensor at step 204. Most members will have a built-in GPS chip on their personal device, and thus this check for a GPS sensor is performed first in some embodiments, before using other location detection techniques. Using a built-in location or GPS sensor and its satellite-identified location also provides the most accurate location information.

If a GPS sensor is not available in step 203, or if the GPS coordinates are not available from step 204, then the system chooses to use other locatable devices that are nearby or that are connected to the member's device, using the second location detection methods described above in relation to FIG. 7. In step 205, location coordinates are requested from a Wifi router to which the member's device is linked. This Wifi router check is used for devices that lack a GPS chip, or for situations when a classroom or building structure blocks the GPS signal of a device. Additional details of determining a member's device location with a Wifi router of step 205 shall be described subsequently in relation to FIG. 9, as indicated by circle A.

Still referring to FIG. 8, if the location of the member's device is unable to be determined with a Wifi router, then further location detection methods are utilized. In step 206, if the device is a mobile device, then in step 207 location coordinates are requested from a network cell tower. In step 206, if the member's device is not a mobile device, then in step 208 data is sent to the server to indicate this status. Thus, the data in step 208 can include a location and corresponding location accuracy of the member's device as determined from i) the GPS data of step 204, ii) the Wifi detection method of FIG. 9 (see circle C in FIG. 8), or iii) the network cell tower of step 207. Alternatively, the data of step 208 may be a message that location data is not available per the previous steps. In step 209 the data is processed, which can include analyzing the location of the member's device in relation to the meeting location's geo-fence, and recording answers to polling or quizzing assessments. In step 210, feedback is sent to the leader, such as creating a listing for the professor of which students have been confirmed for their location, or compiling results from the assessment. Feedback is also provided to the leader in step 210 if the system does not have permission to access location data as denoted by path 211, where the feedback may state that verification of the member's location is unable to be performed.

Flowchart 300 of FIG. 9 describes embodiments of steps associated with the second location detection methods. Circle A of FIG. 8 indicates the relation of step 205 to the the Wifi router detection methods of FIG. 9. Checking a Wifi router may also include checking other devices that are connected to the same router, and accessing their GPS chip if possible to ensure the location identification of the member's device. If the member's device does not have an embedded GPS or location sensor, in step 221 the system attempts to request coordinates from a Wifi router or other device to which the member's device is connected. In step 222, the system asks for the location of the connected router. In step 223, if the router has a location connected to it, then the location data received from the router is returned in step 224.

If there is no Wifi router connected to the member's device from which a location can be derived, then in step 225 the system asks for a main router's location. In some embodiments, the main router (e.g., main router 142 of FIG. 7) is a wired or wireless router through which a plurality of WiFi routers connect to communicate with the Internet or the server 101. In some embodiments, the main router 142 is a component of a local area network (LAN) or wide area network (WAN) in the vicinity of the meeting room. A main router may need to be utilized for location detection when, for example, a local Wifi router is not configured properly. If the main router has a detectable location, the location data that is received from the main router is returned to the system in step 226. In step 227, if no router locations are accessible from the member's Wifi connections or from the main router, then a location protocol is used to get location data from other devices connected to the same router. (e.g., nearby cell tower, internet service provider, radio transponder, or near field communication). If the device is using a web application, then the location protocol uses, for example, an HTML5 protocol; if the device is using a native application on a mobile device, then the location protocol may use that native application.

In some embodiments, the location of an internet service provider is checked, and if this is not available, then cell phone triangulation is used. Step 227 of FIG. 9 may be required when routers are not connected or are not functioning properly. When checking an internet service provider, only location information available is pulled from the location internet providers. For cell phone triangulation, the location of the closest cell tower is checked. The location data received from the location algorithm is then returned to the system in step 228. Since cell phone triangulation results in much less accuracy than the other location techniques, in some embodiments this is the last detection check that is performed. If none of these location detection methods results in an identifiable location of the member, it is likely that the member has their location settings turned off.

If locations are able to be determined from any of the options in FIG. 9, such as from steps 224, 226 or 228, then the location is sent to the system per circles C in FIG. 9 to circle C in FIG. 8.

Flowchart 400 of FIG. 10 describes steps associated with processing data for setting a geo-fence, to be used in relation to step 209 (see circle B) of FIG. 8. Step 241 of FIG. 10 is equivalent to step 209 of FIG. 8. In this embodiment of step 242, the location of a leader's device and the location of a main router to which the professor is connected are obtained. In other embodiments, the location associated with the meeting may be defined in other ways, such as by a sensor in the meeting room or by a known location within the meeting area. In step 243, an algorithm is used to turn the positions (i.e. locations) into an area to cover the classroom size and main router with radii size, based on the accuracy of the data received. This algorithm converts the audience member's and leader's locations into distances using the following variant of the Haversine formulas:

$$a = \sin^2(\Delta\varphi/2) + \cos\varphi_1 \cdot \cos\varphi_2 \cdot \sin^2(\Delta\lambda/2)$$

$$c = 2 \cdot \text{atan } 2(\sqrt{a}, \sqrt{(1-a)})$$

$$\text{distance} = R^*c$$

φ1=latitude of leader
φ2=latitude of member
Δφ=difference of latitude
Δλ=difference of longitude
R=the radius of the earth
atan2=is like atan that takes x and y as arguments instead of a ratio In the algorithm, the latitude and longitude of the locations are converted to radians. Differences between the latitudinal and longitudinal positions are then calculated. The values are plugged into the formula, where φ1 is the latitude position of the leader, φ2 is the latitude position of the member, Δφ is the difference of latitude between the leader and member, and φ2 is the difference of longitude between the leader and member. First, the square of half of the chord length between the two points of the leader's and member's locations is calculated. Then the angular distance of the square of half of the chord is calculated. Finally, the results are multiplied by the radius of the earth, and converted to a desired measurement unit (e.g., meters, kilometers, feet, etc.).

In step 244, the student's position is converted to a distance from the class area; that is, from the center of the geo-fence, which is the professor's location. Thus, the system checks the resulting distance of the member with a pre-defined geo-fence around the leader's location. In some cases where the leader's location signal is blocked or is weak, the leader's main router may be used to set the leader's location. The pre-defined geo-fence distance is set, for example, based on information on sizes of certain classrooms, such as thirty to fifty meters plus accuracy correction.

Although the embodiment of steps 244 and 245 are described in terms of a circular geo-fence, in other embodiments different shapes of a geo-fence may be utilized. For example, the radial distance of the member from the leader may be calculated in terms of a more general elliptical shape such as an oval. In other embodiments, the geo-fence area may be set by a known shape or area of a meeting room or building, or by a polygon, or latitudinal and longitudinal coordinates representing the meeting location. In various embodiments the member's location may be determined as being in the geo-fence by, for example, calculating a proximity to the perimeter of the geo-fence area, or by their spatial coordinates relative to the geo-fence area, or by comparison to an effective radius of the geo-fence area, or other appropriate methods. In some embodiments, the determination of location may account for three-dimensional positioning, such as if the meeting room has multiple levels. In various embodiments, the geo-fence is based on a location associated with a meeting, which may or may not be associated specifically with the leader. For example, the geo-fence may be derived from known coordinates of the meeting facility or detection of a locatable device associated with the facility, rather than from the leader's location.

Returning to FIG. 10, if the student's distance from the center of the geo-fence is within the specified range in step 245, then the student is verified as attending the class. The system's database is updated in step 246 to, for example, record the student's attendance, verify their location, or record points or credits. In step 247 feedback is sent to a member and/or leader, such as to inform them that attendance has been confirmed, the input code was incorrect, or that the member is outside the attendance area. Upon verification of location, the leader and audience members can interact via any sort of communication methods through their devices, such as communicating through polls, quizzes, messages, and chats. If the member's location fails being verified, then the audience member is unable to interact or check in to the session.

Figure 11:
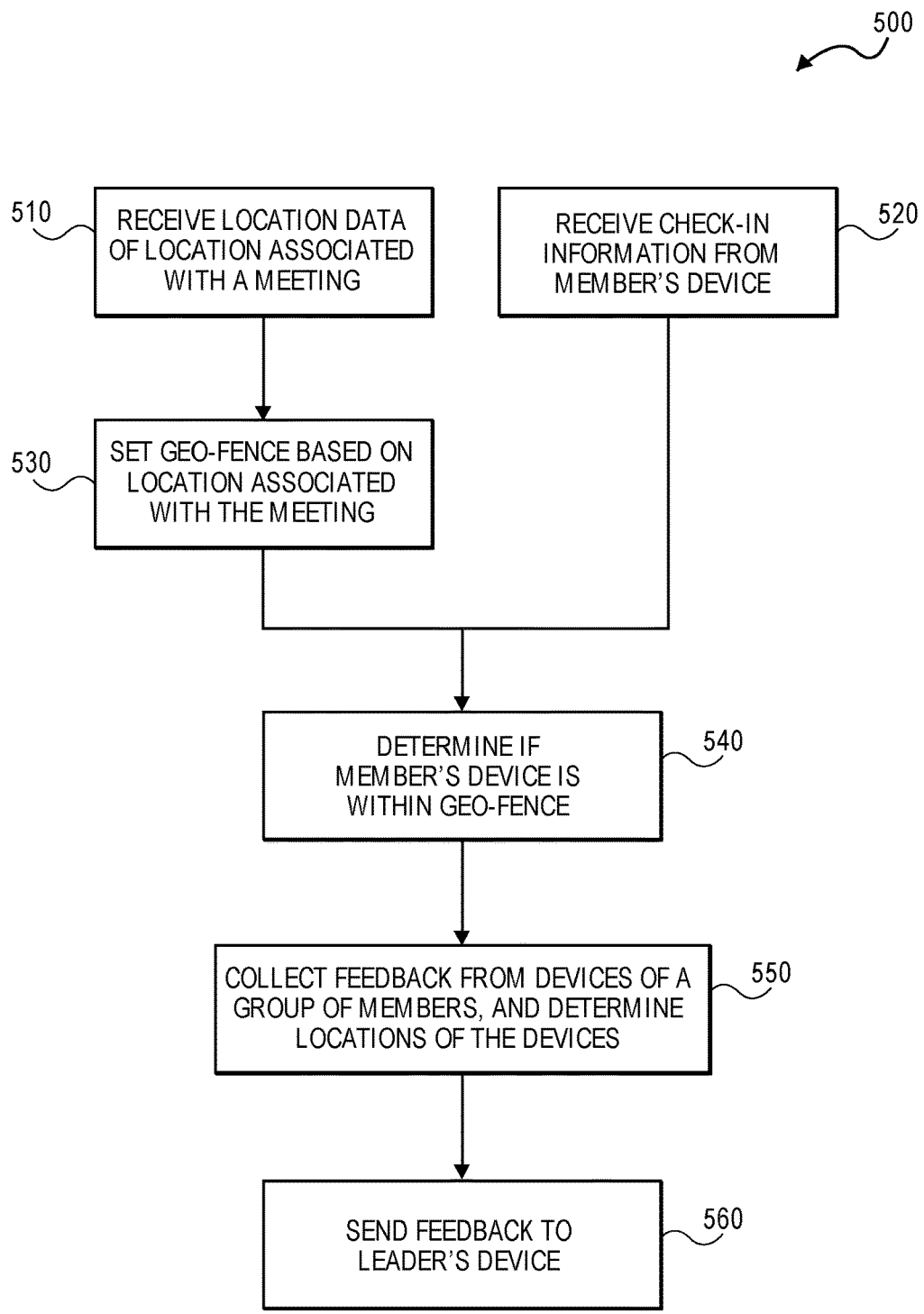
FIG. 11 is a flowchart of methods for facilitating a meeting, according to various embodiments.

In operation, as illustrated by flowchart 500 of FIG. 11, a method involves receiving 510, by a computer hardware processor, location data of a location associated with a meeting. The location associated with the meeting is based on at least one of: a location of the leader's device, a known location of a facility in which the meeting is held, and a locatable device disposed within the facility. In step 520 the computer hardware processor receives check-in information from a member's device associated with an audience member. The member may check into the session by, for example, clicking a check-in button, or by inputting a personal code. In some embodiments, the meeting is an academic class, the leader is a teacher, and the member of the audience is a student of the class. In some embodiments the processor receives a code from a member in an audience, and verifies if the code matches a unique code that has been generated for the leader.

Flowchart 500 also includes setting a geo-fence based on the location associated with the meeting in step 530, and determining if the member's device is in the geo-fence in step 540. Determining the location of the member's device includes using at least one of: (a) using a location sensor disposed within the member's device; and (b) identifying a locatable device that has a known location and that is connected to or nearby the member's device. The identifying of a locatable device relates to the second location detection methods described above, which involves using other devices connected to or that are nearby the device associated with the member. In some embodiments, the member's device is a mobile device such as a smartphone, tablet, laptop or smartwatch. In some embodiments, the identifying of a locatable device utilizes Wifi router coordinates, coordinates of a main router associated with the member's device, coordinates of a mobile device wirelessly connected to the same WiFi router to which the member's device is connected, cellular triangulation, a Wifi router polling of nearby devices, an internet service provider, a radio transponder device, or near field communication. In some embodiments, if a Wifi router is available, the identifying of a locatable device includes using the Wifi router to determine the location of the member's device, the Wifi router being associated with member's device. If the Wifi router is not available, then the method uses a main router to determine the location of the member's device, the main router being associated with member's device.

In step 550, feedback is collected from a plurality of devices associated with a group of members of the audience, each one of the plurality of devices having its location determined as to whether it is within the geo-fence using at least one of (a) or (b) in conjunction with the collecting of feedback. The determination of the location of the plurality of devices may be performed, for example, when the feedback is collected or soon after. The feedback may be responses to an assessment, such as answers to a poll or quiz question. The feedback is sent to the leader's device in step 560.

In some embodiments, the determining if the member is in the geo-fence in step 540 includes determining if the location sensor is present in the member's device. If the location sensor is present, then the determining if the member's device is within the geo-fence uses the location sensor disposed within the member's device. If the location sensor is not present in the member's device, then the determining if the member's device is within the geo-fence uses the identifying of the locatable device. In certain embodiments, the determining of step 540 includes calculating a distance of the member's device from the location associated with the meeting, and determining if the distance is less than a radius of the geo-fence if the geo-fence is elliptical. For example, the calculating and determining if the distance is within the geo-fence can be performed using the Haversine-type algorithm described earlier in this disclosure. In embodiments where the member is requested to enter a code matching the leader's unique code, the determining if the member's device is in the geo-fence may occur during or after the member's code is verified as matching the leader's code, and/or during or after collecting feedback from at least some of the group of members.

In other embodiments, feedback is a response to an assessment generated, where the assessment is generated by the leader. The assessment may be a question requiring the member to answer during the meeting, such that the assessment is performed in real-time. Yet other embodiments include processing the feedback to send data, points or credits to the member's device or the leader's device.

Figure 12:
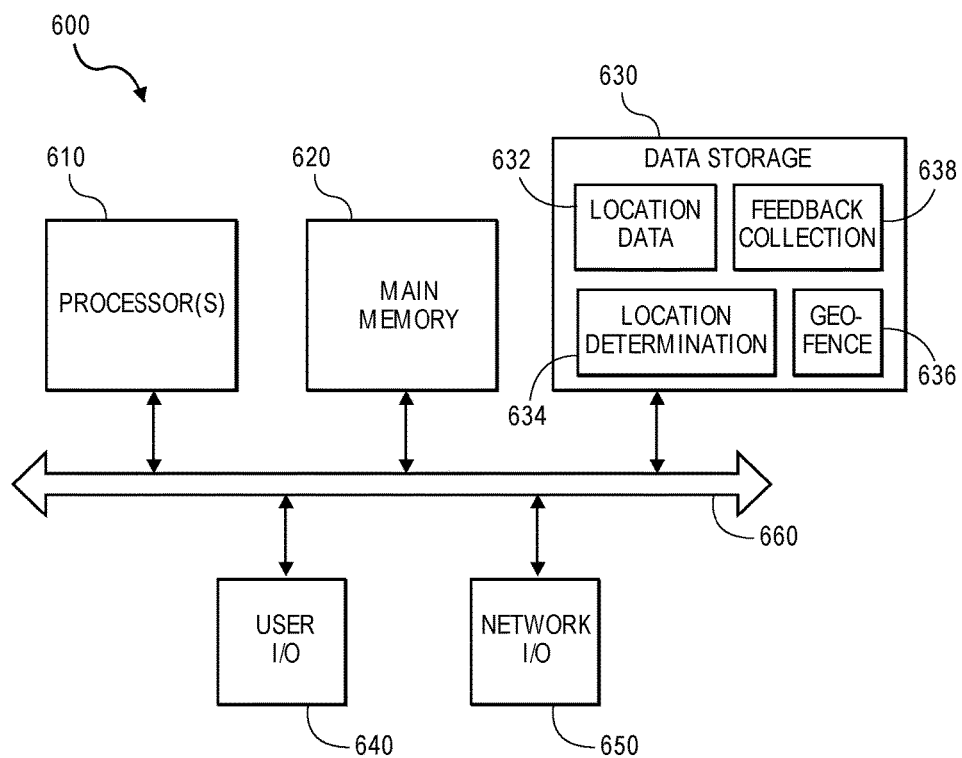
FIG. 12 is a simplified schematic diagram of a computer hardware device in accordance with embodiments of the present disclosure.

FIG. 12 is a simplified schematic diagram of a computer hardware device 600 that may be used to perform the steps of flowchart 500. The computer hardware device 600 may be, for example, a server on which the software application system and/or database is housed. Computer hardware device 600 generally includes at least one computer hardware processor 610, a main memory 620, a data storage 630, a user input/output (I/O) 640, and a network I/O 650, among other components not shown for simplicity, connected or coupled together by a data communication subsystem 660. Other embodiments may use other components and combinations of components. For example, the device 600 may represent one or more physical computer devices, such as web servers, network storage devices, etc. In some embodiments the device 600 may be implemented at least partially in a cloud network. The computer hardware processor 610 represents, in various embodiments, a single processing device or computing device, more than one processing device in a single computer, or more than one computer, server, or computing device.

The main memory 620 represents one or more random access memory modules (RAM) modules on one or more printed circuit boards (PCBs) in one or more housings or enclosures. The data storage 630 represents any appropriate number or combination of internal or external physical mass storage devices, such as hard drives, optical drives, network-attached storage (NAS) devices, flash drives, etc. The user I/O 640 represents one or more appropriate user interface devices, such as keyboards, touch screens, pointing devices, displays, etc., which may be present on a mobile or stationary device. The network I/O 650 represents any appropriate networking devices, such as network adapters, etc. for communicating through the network. The data communication subsystem 660 represents any appropriate communication hardware for connecting the other components in a single unit or in a distributed manner on one or more PCBs, within one or more housings or enclosures, within one or more rack assemblies, etc.

The data storage 630 stores the non-transitory computer-readable medium for executing the steps of the present methods, which are loaded into the main memory 620 and run by processor 610. The non-transitory machine-readable medium includes instructions executable by a computer processor, the instructions causing the computer processor to perform steps such as those in the flowcharts of the present disclosure. Data storage 630 may include modules pertaining to, for example, location data 632 received from the leader's and/or member's device, location determination 634 of the leader's and/or member's devices, geo-fence 636, and feedback collection 638. These units are shown for example only, and do not limit or exclude other configurations of data storage 630.

Figure 13:
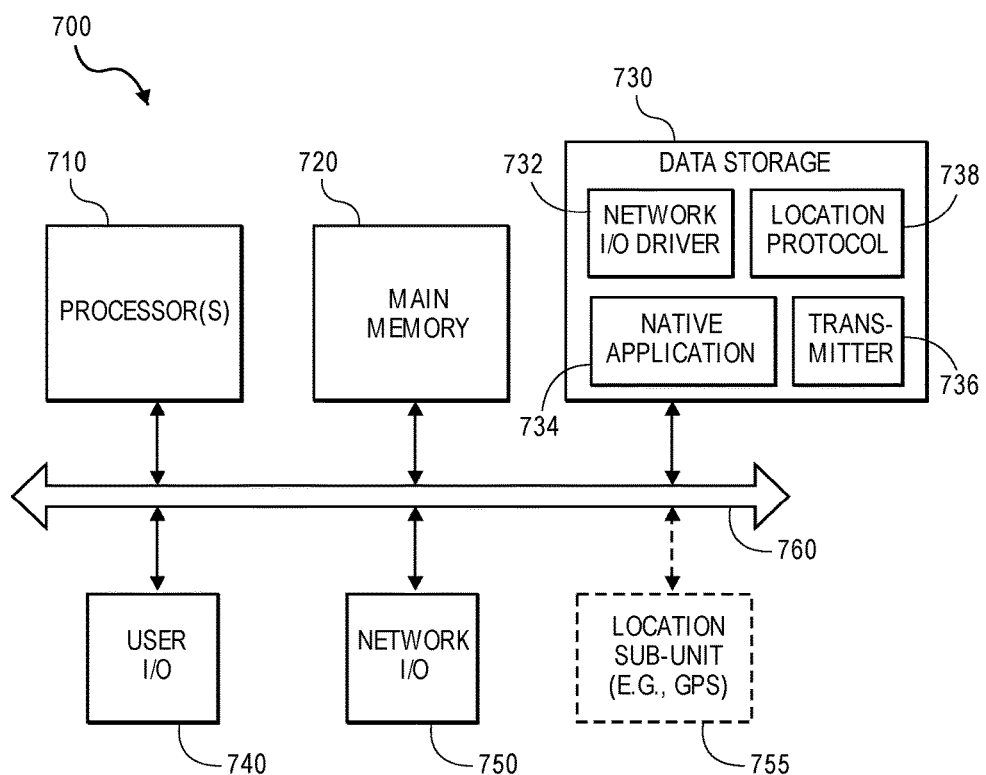
FIG. 13 is a simplified schematic diagram of a member's device in accordance with embodiments of the present disclosure.

FIG. 13 shows a simplified schematic diagram of an electronic device 700 associated with a member, which may be a mobile device such as a smartphone, tablet, or laptop, or may be a stationary device such as a desktop computer. Device 700 generally includes at least one computer hardware processor 710, a main memory 720, a data storage 730, a user input/output (I/O) 740, and a network I/O 750, among other components not shown for simplicity, connected or coupled together by a data communication subsystem 760. Device 700 may also include a location sub-unit such as a GPS sensor 755, shown in dashed lines to indicate that the sensor may or may not be present.

Data storage 730 may include, for example, network input/output driver 732, a native application 734 that runs the software application of the present methods, a transmitter 736 which sends signals such as location data and member's responses to queries, and location protocol 738 that gathers location information using location sub-unit 755. The units in data storage 730 are loaded into the main memory 720 and run by processor 710. The units illustrated are provided as examples only, and do not define or limit the extent of data storage 730.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention. Furthermore, those of ordinary skill in the art will appreciate that the foregoing description is by way of example only, and is not intended to limit the invention. Thus, it is intended that the present subject matter covers such modifications and variations.

What is claimed is:

1. A method comprising:
   receiving, by a computer hardware processor, location data of a location associated with a meeting, wherein the meeting has a leader;
   setting, by the computer hardware processor and based at least in part on the location data, a geo-fence;
   receiving, by the computer hardware processor, check-in information from a member device associated with a member in an audience;
   determining, by the computer hardware processor, if the member device includes a location sensor;
   responsive to determining, by the computer hardware processor, that the member device includes a location sensor, locating the member device using location sensor information to determine if the member device is within the geo-fence
   responsive to determining, by the computer hardware processor, that the member device does not include a location sensor, locating the member device by identifying a locatable device having a known location and that is connected to or nearby the member device to determine if the member device is within the geo-fence;
   collecting, by the computer hardware processor, feedback from a plurality of member devices, each member device associated with a a respective member of the audience; and
   sending, by the computer hardware processor, the feedback to a leader device associated with the leader.

2. The method of claim 1, wherein determining if the member device is within the geo-fence further comprises:
   calculating a distance of the member device from the location associated with the meeting; and
   determining if the distance is less than a radius of the geo-fence.

3. The method of claim 1, wherein receiving check-in information comprises:
   generating a unique code for the leader;
   receiving a code from a member device associated with a member in the audience; and
   verifying if the code received from the member device matches the unique code.

4. The method of claim 3, wherein determining if the member device is within the geo-fence is performed during or after at least one of (i) verifying if the code matches the unique code and (ii) collecting feedback.

5. The method of claim 1, wherein identifying a locatable device utilizes at least one of: Wifi router coordinates, coordinates of a main router associated with the member device, coordinates of a mobile device wirelessly connected to a WiFi router to which the member device is connected, cellular triangulation, a Wifi router polling of nearby devices, an internet service provider, a radio transponder device, and near field communication.

6. The method of claim 1, wherein identifying a locatable device comprises:
   (i) if a Wifi router is available, using the Wifi router to determine the location of the member device, the Wifi router being associated with the member device;
   (ii) if the Wifi router is not available, using a main router to determine the location of the member device, the main router being associated with the member device.

7. The method of claim 1, wherein the feedback is a response to an assessment, the assessment generated by the leader.

8. The method of claim 7, wherein the assessment is a question requiring the member to answer during the meeting.

9. The method of claim 1, further comprising processing the feedback to send data, points or credits to the member device or the leader device.

10. The method of claim 1, wherein the location sensor is a global positioning system (GPS) sensor.

11. The method of claim 1, wherein the location associated with the meeting is based on at least one of: a location of the leader device, a known location of a facility in which the meeting is held, and a locatable device disposed within the facility.

12. The method of claim 1, wherein the member device is a mobile device selected from the group consisting of a smartphone, tablet, laptop and smartwatch.

13. The method of claim 1, wherein the meeting is an academic class, the leader is a teacher, and the member of the audience is a student of the class.

14. A non-transitory machine-readable medium including instructions executable by a computer processor, the instructions causing the computer processor to:

receive location data of a location associated with a meeting, the meeting having a leader;

receive check-in information from a member device associated with a member in an audience;

set a geo-fence based on the location associated with the meeting;

determine if the member device includes a location sensor;

responsive to determining that the member device includes a location sensor, determine if the member device is within the geo-fence using the location sensor to locate the member's device;

responsive to determining that the member device does not include a location sensor, determine if the member device is within the ego-fence by identifying a locatable device that has a known location and that is connected to or nearby the member, device;

collect feedback from a plurality of member devices, each member device associated with a a respective member of the audience; and send the feedback to a leader device associated with the leader.

15. The non-transitory machine-readable medium of claim 14, wherein determining if the member device is within the geo-fence further comprises:

calculating a distance of the member device from the location associated with the meeting; and determining if the distance is less than a radius of the geo-fence.

16. The non-transitory machine-readable medium of claim 14, wherein identifying a locatable device utilizes at least one of: Wifi router coordinates, coordinates of a main router associated with the member device, coordinates of a mobile device wirelessly connected to a WiFi router to which the member device is connected, cellular triangulation, a Wifi router polling of nearby devices, an internet service provider, a radio transponder device, or near field communication.

17. The non-transitory machine-readable medium of claim 14, wherein identifying a locatable device comprises:

(i) if a Wifi router is available, using the Wifi router to determine the location of the member device, the Wifi router being associated with the member device;

(ii) if the Wifi router is not available, using a main router to determine the location of the member device, the main router being associated with the member device.

18. The non-transitory machine-readable medium of claim 14, wherein the feedback is a response to an assessment generated by the leader.

* * * * *